UNITED STATES PATENT OFFICE.

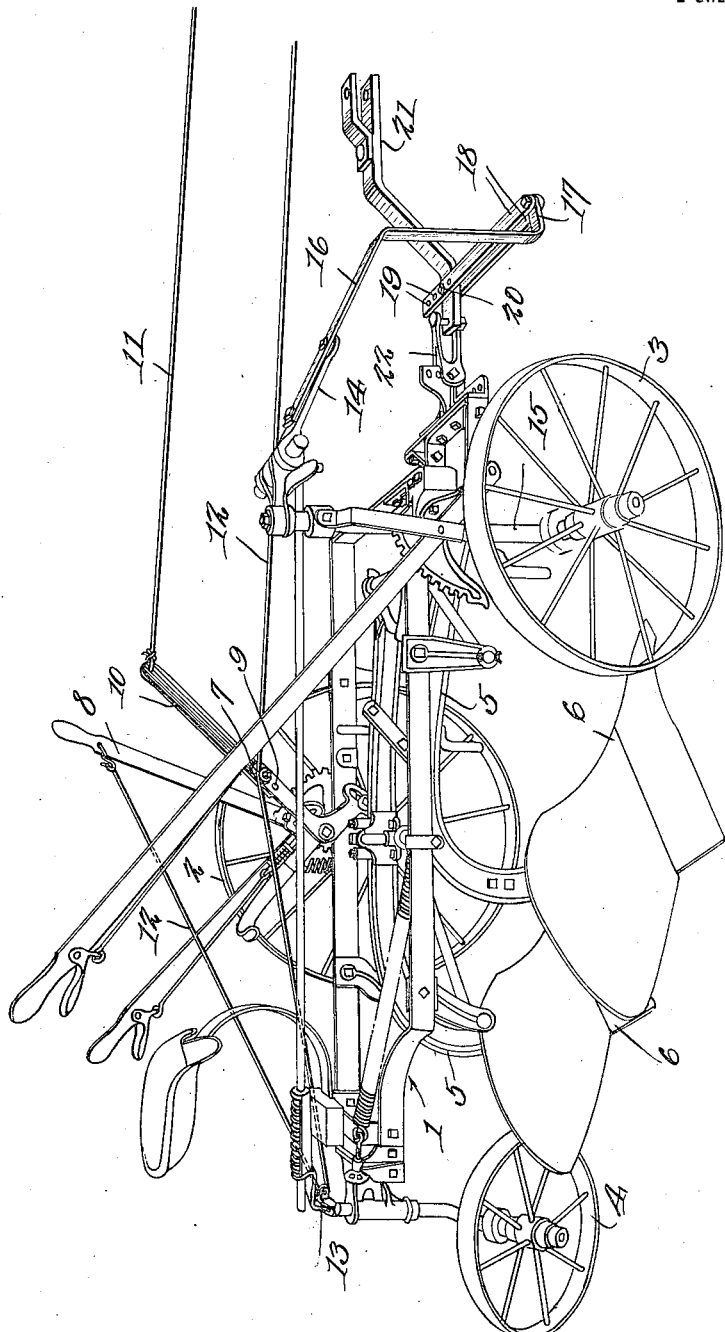

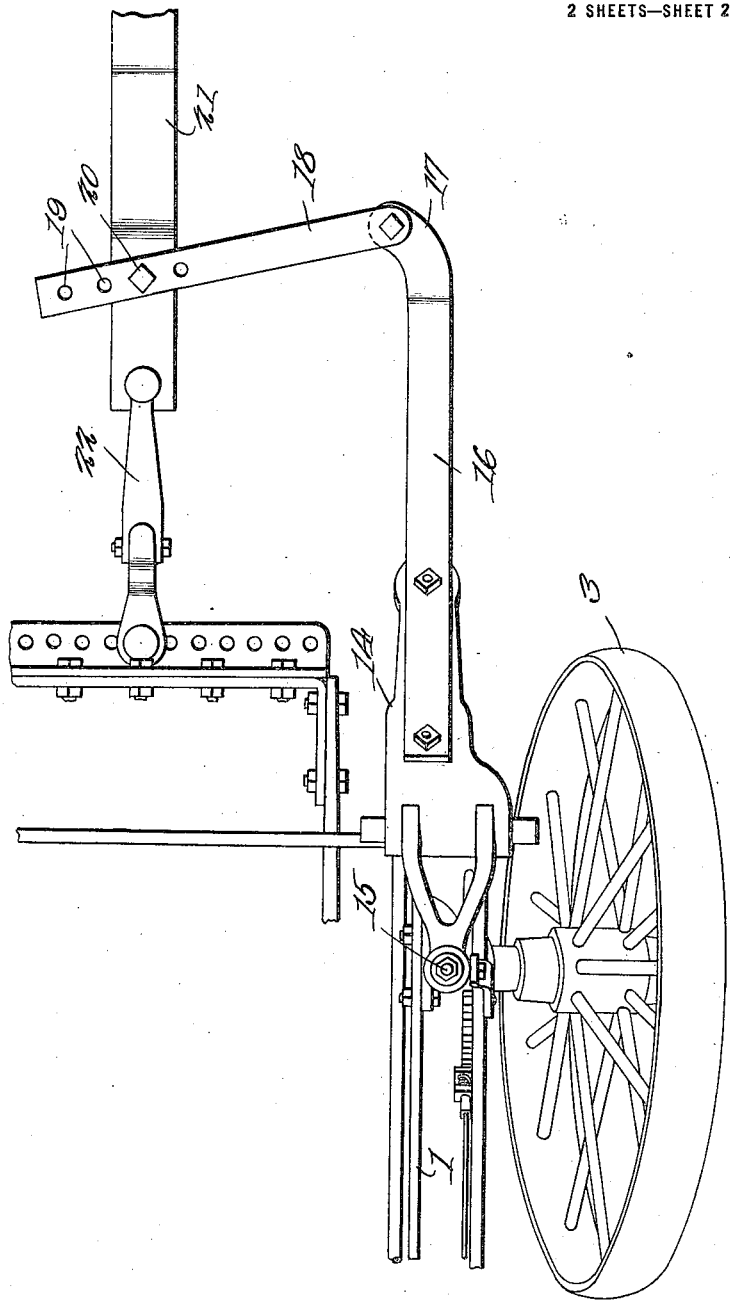

HOMER A. COFFMAN, OF KEOTA, IOWA.

PLOW.

1,262,176. Specification of Letters Patent. Patented Apr. 9, 1918.

Application filed September 13, 1917. Serial No. 191,209.

*To all whom it may concern:*

Be it known that I, HOMER A. COFFMAN, a citizen of the United States, residing at Keota, in the county of Keokuk and State of Iowa, have invented a new and useful Plow, of which the following is a specification.

The subject of this invention is a plow, and the objects of the invention are, first, to provide draft means to permit an ordinary riding plow to be drawn by a tractor, second, to provide means for operating a plow from the tractor, third, to provide an adjustable draft rigging, fourth, to provide a simple and efficient plow.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

A practical embodiment of the invention is shown in the accompanying drawings, wherein:

Figure 1 is a perspective view of a plow constructed in accordance with the invention;

Fig. 2 is an enlarged plan view of the draft rigging, a fragment of the plow frame being shown.

Referring to the drawings by numerals of reference:

A usual form of riding plow is shown consisting of a frame 1 supported on the main wheel 2, the pivotally mounted furrow wheel 3 and the pivoted follower or tracker wheel 4.

Plow standards 5 are hung in the frame and to their depending ends the plow shares 6 are secured. These plow standards and plow shares are raised and lowered in the usual manner by a foot lever 7 and a hand lever 8.

To the foot lever 7 is secured, by a bolt 9 or otherwise an extension or lever arm 10 to which is secured a cable 11 adapted to extend forwardly to the seat of the driver of a tractor. To the lever arm 8 is also secured a cable 12 which passes rearwardly and over a pulley 13 which is secured to the rear portion of the frame 1, and thence forwardly to the tractor.

As illustrated in Fig. 1, the standards are in lowered position and the levers 7 and 8 thrown forward. To raise the standards and lift the plow shares to inoperative position the cable 12 would be drawn forward, throwing the levers rearwardly and raising the standards. When the standards are again to be lowered, the cable 11 is drawn forward, bringing the levers again to their forward position, as illustrated.

The usual tongue or pole plate 14 is hinged to the upper end of the standard 15 of the furrow wheel 3. To the pole plate is attached a bent bar 16, which extends forwardly and downwardly and terminates in a forwardly projecting finger 17. Pivotally secured to the finger 17 are the parallel links 18 which are provided with a series of longitudinal alining apertures 19 adapted to selectively receive a coupling pin 20. The coupling pin 20 also passes through an aperture formed in a draw bar 21, which draw bar is connected to the plow by the clevis 22, or in any suitable manner.

As will be seen, the distance between the finger 17 and draw bar 21 may be varied by placing the pin 20 in one or another pair of apertures 19. By this structure the furrow wheel is caused to turn in unison with the draw bar and the plow is thus constrained to track properly behind the tractor.

Having thus described the invention, what is claimed as new and sought by Letters Patent, is:

1. A plow comprising a wheel supported frame including a pivotally mounted wheel, a pole plate pivoting with the wheel, a bar secured to the pole plate and extending forwardly and downwardly therefrom, a draw bar pivotally secured to the frame, and a link connection between the draw bar and the bar.

2. A plow comprising a wheel supported frame including a pivotally mounted furrow wheel having a vertical standard, a pole plate secured to the standard and pivoting with the wheel, a bar secured to the pole plate and extending forwardly and downwardly therefrom and merging into a forwardly projecting horizontally disposed end, a draw bar pivotally secured to the frame, and a link connection between the draw bar and the forwardly projecting end of the bar.

In testimony that I claim the foregoing as my own, I have hereto affixed my signature in the presence of two witnesses.

HOMER A. COFFMAN.

Witnesses:
 CHAS. D. HERR,
 J. G. RANOUS.

Copies of this patent may be obtained for five cents each, by addressing the "Commissioner of Patents, Washington, D. C."